US012785812B2

(12) United States Patent
Sinclair et al.

(10) Patent No.: US 12,785,812 B2
(45) Date of Patent: Nov. 3, 2026

(54) LOW BAUD SAFE START FOR LASER CENTERING CONTROL

(71) Applicant: CIENA CORPORATION, Hanover, MD (US)

(72) Inventors: Andrew Sinclair, Ottawa (CA); Kim Byron Roberts, Ottawa (CA)

(73) Assignee: CIENA CORPORATION, Fulton, MD (US)

( * ) Notice: Subject to any disclaimer, the term of this patent is extended or adjusted under 35 U.S.C. 154(b) by 290 days.

(21) Appl. No.: 18/787,288

(22) Filed: Jul. 29, 2024

(65) Prior Publication Data

US 2025/0105922 A1 Mar. 27, 2025

Related U.S. Application Data

(60) Provisional application No. 63/584,649, filed on Sep. 22, 2023.

(51) Int. Cl.

| | |
|---|---|
| ***H04B 10/00*** | (2013.01) |
| ***H04B 10/50*** | (2013.01) |
| ***H04B 10/572*** | (2013.01) |
| ***H04J 14/02*** | (2006.01) |
| *H04J 14/00* | (2006.01) |

(52) U.S. Cl.

CPC ......... *H04B 10/503* (2013.01); *H04B 10/572* (2013.01); *H04J 14/0305* (2023.08)

(58) Field of Classification Search

CPC ............ H04B 10/07957; H04B 10/506; H04B 10/572

See application file for complete search history.

(56) References Cited

U.S. PATENT DOCUMENTS

| | | | | |
|---|---|---|---|---|
| 7,555,227 | B2 | 6/2009 | Bontu et al. | |
| 7,606,498 | B1 | 10/2009 | Wu et al. | |
| 8,005,368 | B2 | 8/2011 | Roberts et al. | |
| 8,805,206 | B2 | 8/2014 | Roberts et al. | |
| 10,148,384 | B2 | 12/2018 | Swinkels et al. | |
| 2012/0076507 | A1 | 3/2012 | Roberts et al. | |
| 2012/0251117 | A1 | 10/2012 | Patel et al. | |
| 2012/0328296 | A1* | 12/2012 | Sullivan ................ | H04J 14/026 398/79 |

(Continued)

OTHER PUBLICATIONS

"European Office Action received for EP Application Serial No. 24783433.6", Apr. 2, 2026, 10 pages.

(Continued)

*Primary Examiner* — Daniel G Dobson

(74) *Attorney, Agent, or Firm* — Guntin & Gust, PLC; Kenneth S. Kwan

(57) ABSTRACT

Aspects of the subject disclosure may include, for example, arranging a signal into a wavelength division multiplexing (WDM) spectral slot, wherein the signal has a first spectral width, communicating with a receiver using the signal, determining one or more network characteristics based on the communicating, adjusting a center wavelength of the signal in accordance with the one or more network characteristics, modifying the signal such that the signal has a second spectral width, resulting in a modified signal, wherein the second spectral width is larger than the first spectral width, and causing the modified signal to carry traffic to the receiver. Other embodiments are disclosed.

20 Claims, 6 Drawing Sheets

(56) References Cited

U.S. PATENT DOCUMENTS

| | | | | |
|---|---|---|---|---|
| 2017/0134114 | A1 | 5/2017 | Boertjes et al. | |
| 2018/0059502 | A1 * | 3/2018 | Yutani | H04B 10/50 |
| 2024/0094470 | A1 * | 3/2024 | Matsui | H04B 10/572 |

OTHER PUBLICATIONS

"International Preliminary Report on Patentability received for PCT Application Serial No. PCT/US2024/046910", Apr. 2, 2026, 8 Pages.
"International Search Report & Written Opinion for PCT/US2024/046910", Dec. 10, 2024, 10 Pages.
Ma, Yiran, et al., "1-Tb/s single-channel coherent optical OFDM transmission over 600-km SSMF fiber with subwavelength bandwidth access", Optics Express, May 22, 2009.
"European Office Action received for EP Application Serial No. 24783433.6, Sep. 10, 2025, 11 Pages".

* cited by examiner

1

300

LOW BAUD SAFE START FOR LASER CENTERING CONTROL

CROSS-REFERENCE TO RELATED APPLICATION

This application claims the benefit of and priority to U.S. Provisional Ser. No. 63/584,649, filed Sep. 22, 2023. The contents of the foregoing are hereby incorporated by reference into this application as if set forth herein in full.

FIELD OF THE DISCLOSURE

The subject disclosure relates to low baud safe start for laser centering control.

BACKGROUND

In a colorless photonic line system (e.g., where various wavelengths can be dynamically assigned to different channels/signals), a modem's transmit signal is generally not constrained or filtered at the input. As such, when it comes to link budgeting, any error in laser frequency (e.g., +/−1 gigahertz (GHz) or the like) can lead to overlap of adjacent channels, which results in reduced performance or outright failure.

BRIEF DESCRIPTION OF THE DRAWINGS

Reference will now be made to the accompanying drawings, which are not necessarily drawn to scale, and wherein.

DETAILED DESCRIPTION

Figure 1:
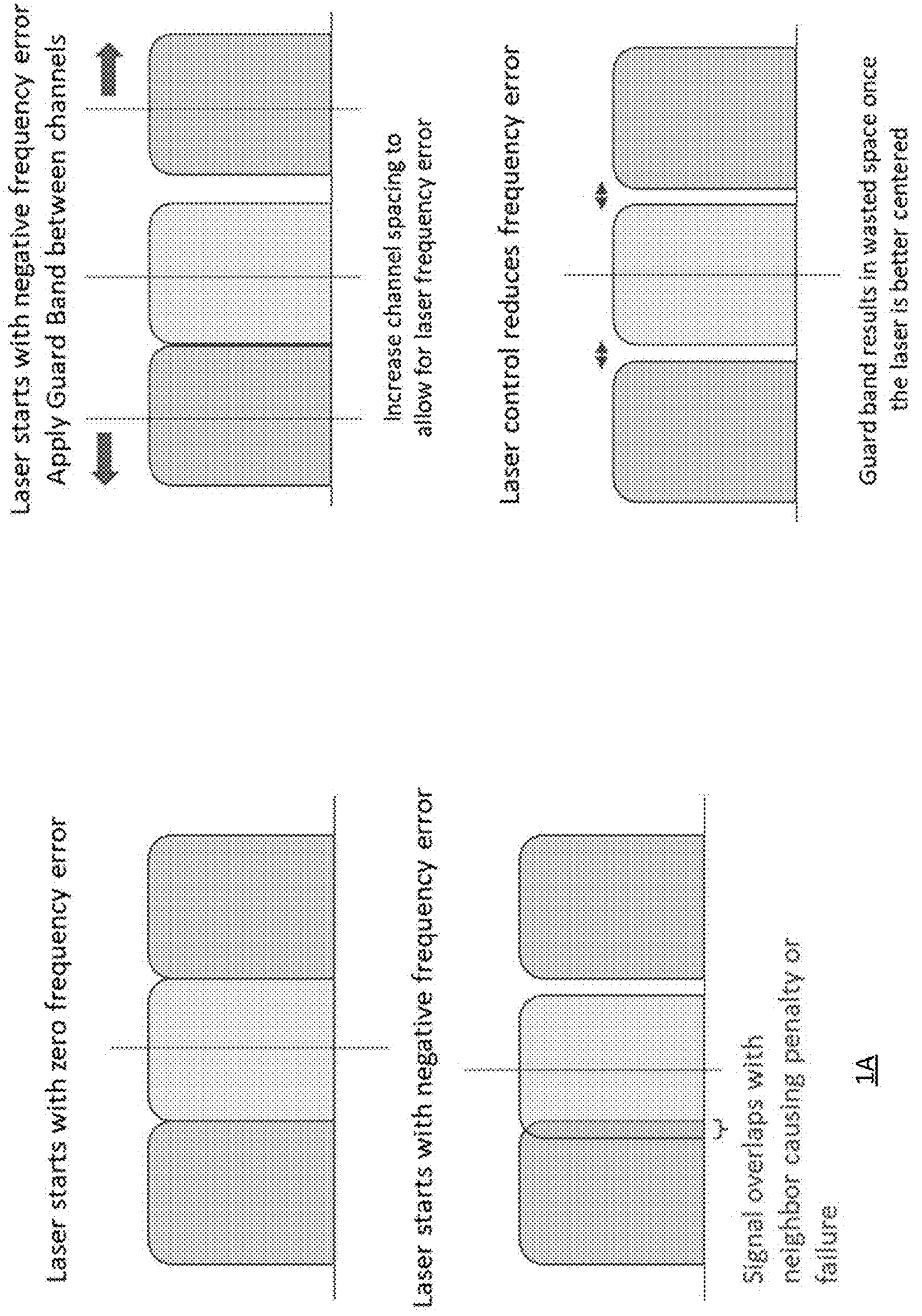
Prior Art FIG. 1
FIG. 1 illustrates negative frequency errors due to signal overlaps and also the use of guard bands between channels.

The above-described issue of overlapping channels becomes more severe as designs move toward Nyquist-spaced channels—i.e., where there is minimal (or even no) spacing between channels (1A of FIG. 1). While methods for actively reducing the amount of laser error (or drift) exist, such as Zero Mean forcing (where the frequencies of the transmitter (Tx) and receiver (Rx) lasers are adjusted such that their assumed errors average to zero), these methods typically only apply after acquisition (i.e., handshaking, error mitigation, and overall laser centering) between the transmitter and receiver has been achieved. Prior to successful acquisition, the laser frequency error is a function of the error specification of the laser itself. To avoid potential problems during acquisition, channel spacings can be chosen to account for such possible error, but this results in wasted spectral space during normal operations when the laser frequencies can be more tightly controlled (1B of FIG. 1). This problem is typically addressed by improving the accuracy of the laser itself. However, increasing the accuracy of the laser's absolute tuning typically results in a much more expensive laser and/or slower tuning times.

The subject disclosure describes illustrative embodiments of a method for a narrow channel start-up mode to enable laser centering control (or laser frequency fine tuning) prior to transitioning to full channel width. In exemplary embodiments, the narrower channel may be generated via a lower baud start-up. In other embodiments, however, this effect may additionally, or alternatively, be achieved via one or more other processes including, but not limited to, selecting reduced frequency division multiplexing (FDM) band(s) during start-up (e.g., by disabling/turning off certain FDMs, such as outer FDMs, so as to reduce the effective/aggregate baud), transmitter filtering (e.g., optical bandpass filtering, electrical filtering, pulse shaping, etc. so as to narrow the bandwidth of the transmitted signal such that it occupies a narrower spectrum), and/or the like. While the laser may nevertheless be "spec'd" with an error (say, e.g., +/−1 GHz), the narrower channel ensures that the laser signal will "fit" in the desired channel bandwidth during acquisition between the transmitter and the receiver. In various embodiments, the baud may be increased after successful acquisition such that the signal "fills" any gap(s) that might exist between the channel and its neighbor(s). In one or more embodiments, the low baud start-up sequence may be applied to facilitate centering control for one or more lasers (e.g., each laser) in a modem or set of modems.

Initializing a transmitter in low baud mode avoids channel overlap issues (or traffic interference) during start-up, which enables the use of tighter-spaced channels. This improves or optimizes spectral efficiencies and provides a more robust and reliable solution for communications system operators. Laser tuning can be achieved (via external control loops) using such a smaller spectral width, which reduces or eliminates a need for absolute laser accuracy. This allows for the use of lower cost/performance lasers, thereby reducing the bill of materials (BOM) costs of modems. In various embodiments, the safe start-up sequence can also be employed as part of an optical transceiver/modem standard for Nyquist squeezed deployments.

Figure 2A:
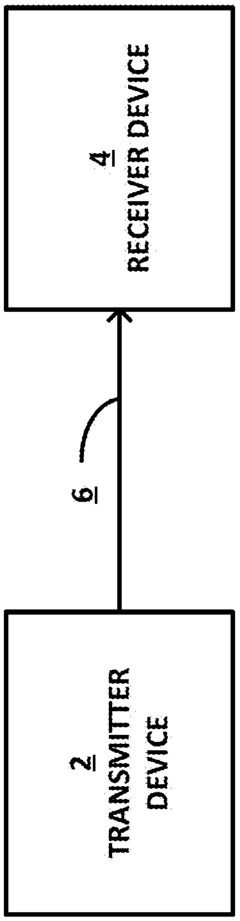
FIG. 2A is a diagram of a non-limiting example of a communication network in accordance with various aspects described herein.

FIG. 2A is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver. In one or more embodiments, the transmitter device 2 and/or the receiver device 4 may be a modem.

The communication network 1 may include additional elements not shown in FIG. 2A. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 2A, such as wavelength selective switches, optical multiplexers, optical de-multiplexers, optical filters, and/or the like.

Figure 2B:
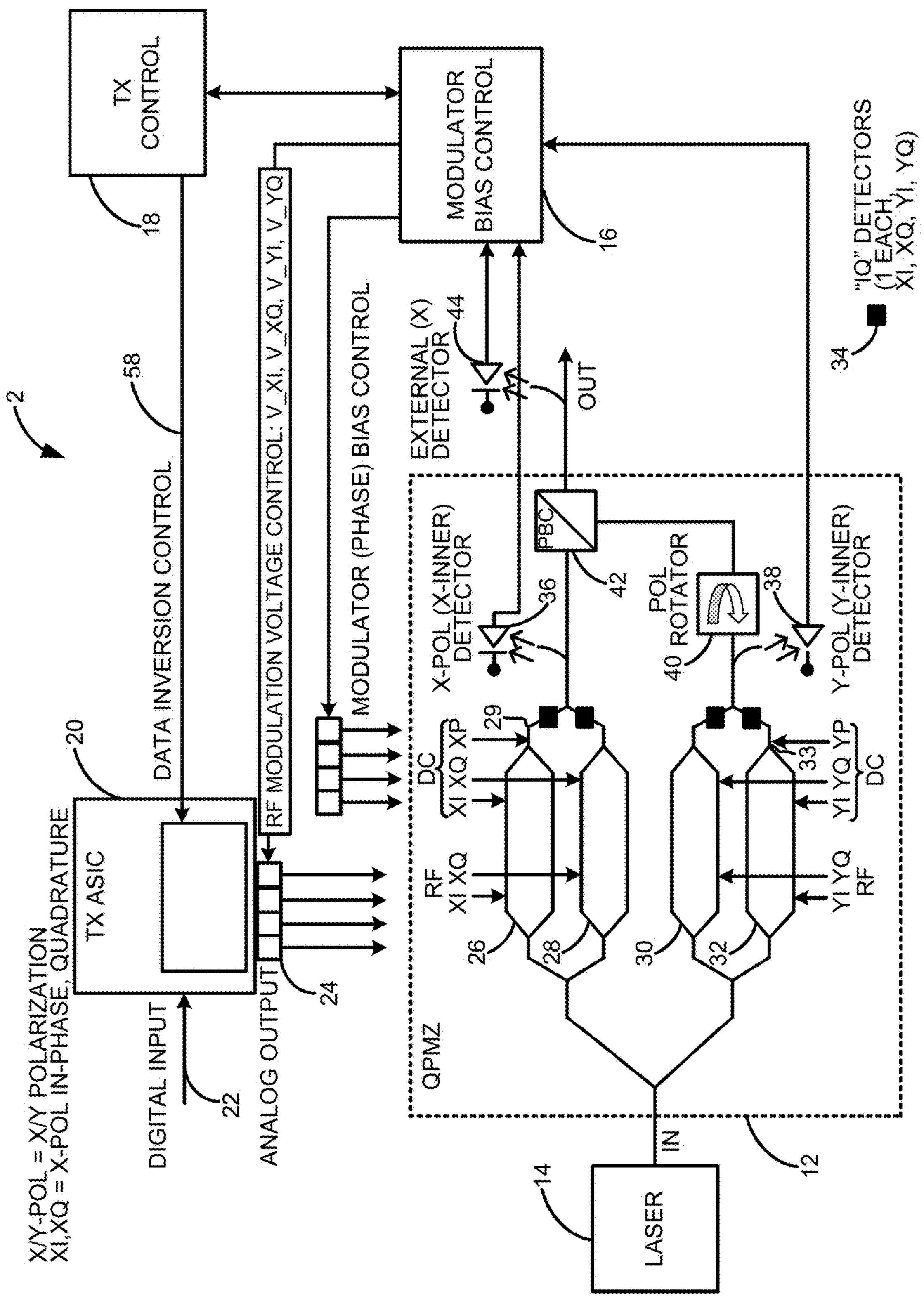
FIG. 2B is a block diagram of an example, non-limiting optical transmitter/modulator system in accordance with various aspects described herein.

FIG. 2B is a block diagram of an example, non-limiting optical transmitter/modulator system 2 in accordance with various aspects described herein. In one or more embodiments, the transmitter device 2 may be configured for use in or on a colorless optical line system (e.g., where various wavelengths can be dynamically assigned to different channels/signals). As shown in FIG. 2B, the transmitter device 2 may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ—resulting in a quad parallel MZ (QPMZ) modulator.

In one or more embodiments, the optical modulator system 2 may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 2B, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Figure 2C:
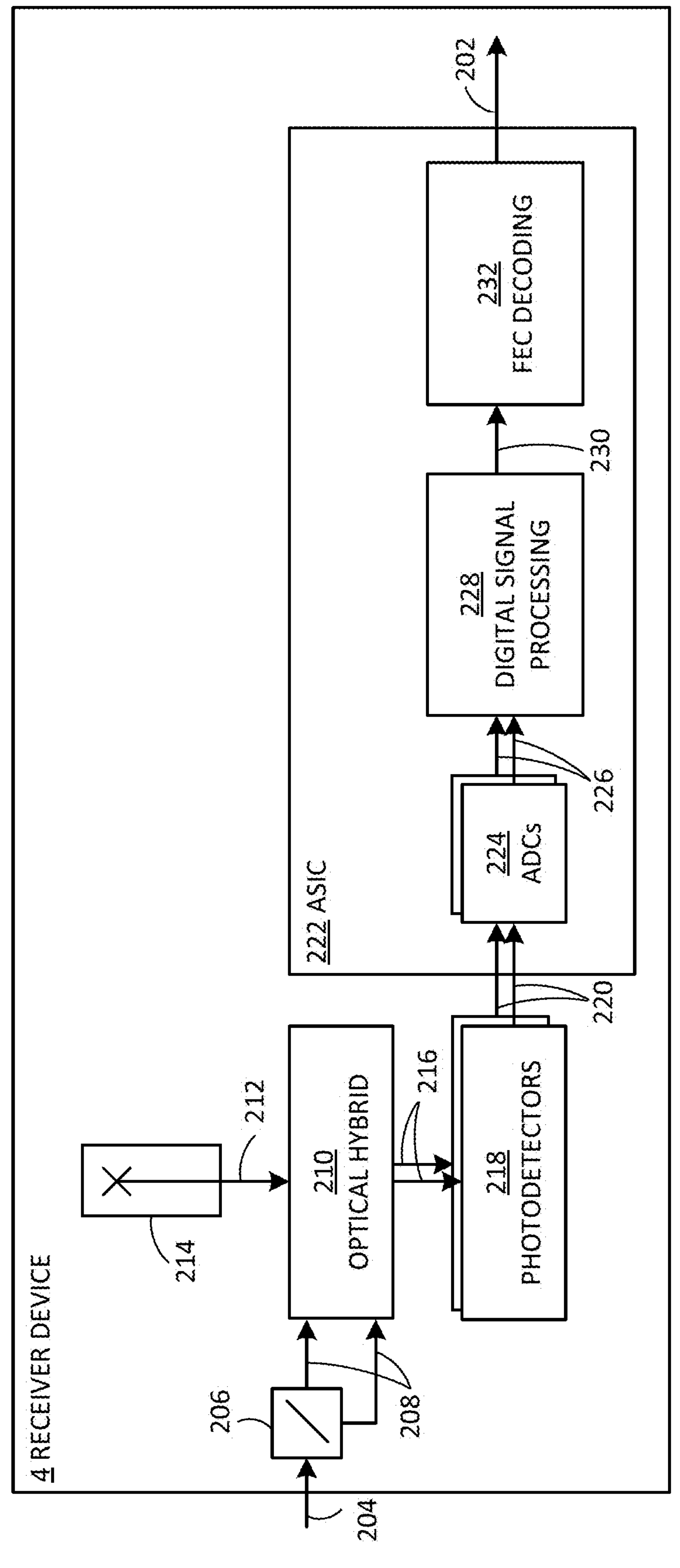
FIG. 2C illustrates an example receiver device in accordance with various aspects described herein.

FIG. 2C illustrates an example receiver device 4 in accordance with various aspects described herein. As shown, the receiver 4 may be configured to receive an optical signal 204, which may comprise a degraded version of an optical signal generated by a transmitter device (e.g., the transmitter device 2 of FIG. 2A). The optical signal generated by the transmitter device may be representative of information bits (also referred to as client bits) which are to be communicated to the receiver device 4. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel over a respective plurality of carriers, and where each carrier is generated by a different laser), and/or the like.

The receiver device 4 may be configured to recover corrected client bits 202 from the received optical signal 204. The receiver device 4 may include a polarizing beam splitter 206 configured to split the received optical signal 204 into polarized components 208. According to one example implementation, the polarized components 208 may include orthogonally polarized components corresponding to an X polarization and a Y polarization. An optical hybrid 210 may be configured to process the components 208 with respect to an optical signal 212 produced by a laser 214, thereby resulting in optical signals 216. Photodetectors 218 may be configured to convert the optical signals 216 output by the optical hybrid 210 to analog electrical signals 220. The frequency difference between the Rx laser and the Tx laser is the Intermediate Frequency, and an offset of that away from nominal can be called fIF. (The nominal difference is usually zero.) According to one example implementation, the analog signals 220 may include four signals corresponding, respectively, to the dimensions XI, XQ, YI, and YQ, where XI and XQ denote the in-phase and quadrature components of the X polarization, and YI and YQ denote the in phase and quadrature components of the Y polarization. Together, elements such as the beam splitter 206, the laser 214, the optical hybrid 210, and the photodetectors 218 may form a communication interface configured to receive optical signals from other devices in a communication network.

As shown in FIG. 2C, the receiver device 4 may include an application specific integrated circuit (ASIC) 222. The ASIC 222 may include analog-to-digital converters (ADCs) 224 that are configured to sample the analog signals 220 and generate respective digital signals 226. In certain alternate embodiments, the ADCs 224 or portions thereof may be separate from the ASIC 222. The ADCs 224 may sample the analog signals 220 periodically at a sample rate that is based on a signal received from a voltage-controlled oscillator (VCO) at the receiver device 4 (not shown). The ASIC 222 may be configured to apply digital signal processing to the digital signals 226 using a digital signal processing system 228. The digital signal processing system 228 may be configured to perform equalization processing that is designed to compensate for a variety of channel impairments, such as CD, SOP rotation, mean polarization mode dispersion (PMD) that determines the probability distribution which instantiates as differential group delay (DGD), polarization dependent loss or gain (PDL or PDG), and/or other effects.

The digital signal processing system 228 may further be configured to perform carrier recovery processing. In various embodiments, carrier recovery processing may involve estimating or identifying the phase of the carrier signal used to transmit data. Such processing may be implemented using a phase-locked loop (PLL) in which feedback is used to lock its output to an input signal (i.e., a recovered optical signal) and where the output is used to control the phase of a local oscillator (LO). One or more controllers may be involved in the control. Carrier frequency can be obtained by taking the derivative of the carrier phase. In certain embodiments, carrier recovery may additionally, or alternatively, involve calculating an estimate of carrier frequency offset fIF (i.e., the difference between the frequency of the transmitter laser and the frequency of the receiver laser 214).

According to some example implementations, the digital signal processing system 228 may further be configured to perform operations such as multiple-input-multiple-output (MIMO) filtering, clock recovery, and FDM subcarrier demultiplexing. Clock recovery may involve estimating a symbol rate of a received signal or the rate at which data is being transmitted. In various embodiments, clock recovery may be performed using a PLL and/or a phase rotator to control a sampling clock of the receiver. One or more controllers may be involved in the control. A phase difference between a locally-generated read clock and a source clock (i.e., a detected receive clock as identified from a stream of source data, or a set of predetermined repeating symbols as identified in the stream of source data) can be reduced or minimized using the clock recovery circuitry.

In certain embodiments, the digital signal processing system 228 may also be configured to perform symbol-to-bit demapping (or decoding) using a decision circuit, such that signals 230 output by the digital signal processing system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the digital signal processing system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

Figure 2D:
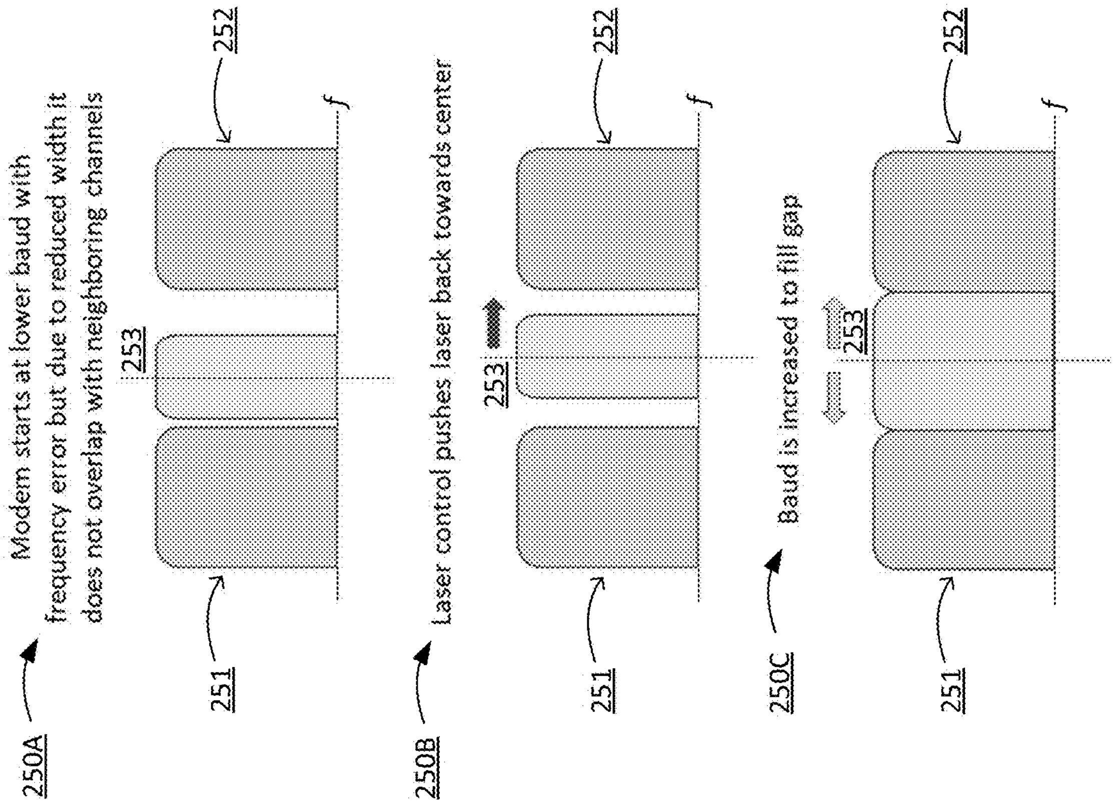
FIG. 2D illustrates an exemplary methodology for a modem acquisition sequence in accordance with various aspects described herein.

FIG. 2D illustrates an exemplary methodology for a modem acquisition sequence in accordance with various aspects described herein. Using this methodology, the aforementioned problem of wasted spectrum can be avoided, allowing for tighter-spaced channels. In some embodiments, a transmitter (e.g., the transmitter/modem 2) may allocate various channels—i.e., including channel 253 as well as other channels 251 and 252—for independent communications. Each channel may correspond to a respective laser source in the transmitter, and thus multiple lasers may be operated in the transmitter. Although not shown, a receiver (e.g., the receiver/modem 4) may be on the receiving end of the communications. Furthermore, although also not shown, additional channels that neighbor the channels 251 and 252 may also be allocated for communications. In certain embodiments, one or more other transmitters that are in communication with the receiver may provide channels 251 and/or 252.

Reference 250A of FIG. 2D illustrates an exemplary start-up condition (start-up mode) in which the transmitter initializes the channel 253 at a lower baud (fewer symbols per second). It will be understood and appreciated that, in the frequency domain, this would equate to a narrower spectral width. In certain alternate embodiments, this effect may additionally, or alternatively, be achieved via one or more other processes. As one example, a narrow spectral width may be achieved by selecting reduced FDM band(s) during start-up. This may involve disabling or turning off certain FDMs, such as outer FDMs, which can essentially reduce the effective/aggregate baud. As another example, a narrow spectral width may be achieved by way of transmitter filtering, such as, for instance, optical bandpass filtering, electrical filtering, pulse shaping, and/or the like. In any case, the channel 253 may be a new channel that is to be added to a WDM network. For instance, the channels 251 and/or 252 may already exist in the WDM network, where there is a need to add the channel 253 for an additional line of communication between the transmitter and the receiver. In any case, while there may still be a laser frequency error in the channel 253, the lower start-up baud thereof advantageously prevents the signal from overlapping with either of the channels 251 and 252. In various embodiments, the start-up baud of the channel 253 may be selected to be low enough so as to avoid interference of the signal with neighboring channels, even assuming a worst case laser error.

Modem acquisition may involve one or more processes by which the transmitter and the receiver establish and synchronize communication. These processes may include carrier frequency acquisition, timing recovery, channel equalization, laser centering, and/or the like. Laser centering, in particular, ensures accurate alignment of the laser frequencies between the transmitter and the receiver so as to allow for maximum power transfer and minimal signal degradation. Reference 250B of FIG. 2D illustrates an exemplary condition in which laser control causes the transmitter laser to adjust in frequency such that the channel 253 at the receiver is centered between neighboring channels 251 and 252. In certain embodiments, the receiver may, as part of acquisition or after successful acquisition, respond to the transmitter (e.g., via a return communication loop) with information regarding various communication parameters, such as information regarding dispersion, path length, time of flight, distance between the receiver and the transmitter, operating frequencies, calibration for I/Q, acquisition status, etc. In one or more embodiments, the transmitter may utilize some or all of this information to control subsequent expansion of the baud (or, in the frequency domain, subsequent increase of the spectral width). For instance, in a case where the receiver provides an indication of successful acquisition, the transmitter may proceed to expand the baud. In some embodiments, after successful acquisition, transmitter/receiver control loop(s) may be invoked to reduce laser error (e.g., via Zero Mean Forcing or similar method(s)) prior to switching the modem to a (full) target baud (mission mode). Reference 250C of FIG. 2D illustrates an exemplary condition in which the baud of the channel 253 is increased or expanded so as to "fill the gap" between the channels 251 and 252.

In exemplary embodiments, the initial (or start-up) baud may be determined or calculated based on a target baud. As an example, the start-up baud may be set to a value that is equal to the target baud less about two times a known (e.g., maximum) laser error. Other start-up baud values are of course possible. In cases where laser errors are generally small, the start-up baud need not be too far away from the ultimate target baud. For instance, in a case where the target baud is 180 gigabaud (Gbaud), the start-up baud can be just slightly under it—e.g., about 170 Gbaud (or 5 or 10 Gbaud of space). The baud can be expanded to the 180 Gbaud target after successful acquisition. In general, as long as the selected start-up or acquisition baud results in a spectral width that accommodates the laser error, the acquisition process should be "safe."

In certain embodiments, in a case where there is a specified range of allowed bauds—e.g., a minimum of 66 Gbaud and a maximum baud of 200 Gbaud, the start-up baud may simply be set to the minimum allowed baud (e.g., 66 Gbaud). Doing so, however, may require a lower data rate during acquisition. Specifically, using a narrower baud at start-up can reduce the possible communication distance over the link. This is because a narrower baud increases required signal-to-noise ratio (SNR). In exemplary embodiments, such a restriction in maximum reach can be addressed by lowering the data rate during acquisition so that the required SNR of the acquisition baud is sufficiently low enough to allow for acquisition (even under stressed conditions).

As an example, assume that the transmitter modem supports 1600 gigabits per second (Gbps) at 200 Gbaud (a maximum data rate that is eight times the baud), where a target baud is 180 Gbaud and a target data rate is 1200 Gbps. In this example, if a start-up baud of 100 Gbaud is selected, the start-up data rate may need to be lower than 1200 Gbps (e.g., 1000 Gbps) so as to allow for proper laser centering. Otherwise, too high of a start-up data rate may require an unreasonably large SNR. In certain embodiments, the start-up data rate may be set based on a corresponding threshold SNR value (e.g., a determined maximum reasonable required SNR) associated with the known link distance.

In some embodiments, the start-up baud may only be slightly lower than the target baud (e.g., about 170 Gbaud in the foregoing example), in which case the start-up data rate may be equal to or slightly lower than the target data rate (e.g., about 1200 Gbps in the foregoing example). In any case, the start-up baud may be selected based on a threshold margin that allows for successful acquisition.

In one or more embodiments, the optical spectrum can be measured at a receiver to facilitate centering of the wavelength of the new signal. This can be achieved by way of a line optical spectrum analyzer (OSA). A typical OSA may include a diffraction grating and an optical filter that scans over wavelengths for power. Coherent OSAs alternatively employ a (beating) receiver laser that is tuned to various frequencies, where incoming light is mixed with the beating laser to measure power across frequencies. In certain embodiments, a receiver that is equipped with OSA capabilities may be operated as an in-field OSA. For instance, such a receiver may be used to scan a spectrum (e.g., an entire C-band spectrum, or a 225 GHz spectral slot) to identify areas with power and/or "holes" or gaps so as to determine exactly where, within such a spectrum, channels are located relative to where a low baud-rate signal can operate and be centered.

In various embodiments, expansion of the baud from the start-up baud to a target baud may not be performed instantaneously, but may instead be done in a smooth ramping manner. Such ramping may be performed while the wavelength is selected or optimized using network margin methods. In some embodiments, the baud rate at which to stop during expansion may be determined as part of the network margin improvement or optimization. One or more network margin methods or techniques may be used—e.g., (i) optimization of the channel bit error rate (BER), where the channel is expanded to reduce or minimize the BER, (ii) monitoring of individual FDM performance and shifting of the frequency or adjustment of the baud to equalize outer FDM performance so as to optimize or improve baud and/or laser centering, (iii) monitoring of neighboring channel performance so as to ensure that baud expansion has minimal to no determined detrimental impact on the neighboring channel(s), (iv) leveraging of current margin to adjust the rate at which the baud is adjusted, where higher margin would allow for bigger (i.e., faster) changes, (v) any other baud expansion technique that involves the use of one or more metrics that can be impacted by wavelength/frequency, or (vi) a combination of some or all of the foregoing methods/techniques. In various embodiments, the smooth ramping up of the baud by the transmitter may be performed in a controlled fashion based on feedback from the receiver. Smooth variations of the baud rate may be effected by way of hardware and/or software.

A goal is to identify a (e.g., maximum) supportable baud in order to improve or optimize performance. Thus, after start-up at low baud and successful acquisition, the receiver may map out SNRs across a spectrum (e.g., at edges of the signal, near a center of the signal, etc.) and inform the transmitter of these SNRs to facilitate the baud expansion. The baud expansion may stop based on a notification from the receiver that the signal has interfered with or has been affected by an existing (neighboring) channel or some other impairing feature, such as a filter edge or the like. In this way, for a laser wavelength at use, a (e.g., maximum) supportable baud may be identified.

It is to be understood and appreciated that, although one or more of FIGS. 2A-2D might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components, devices, systems, modules, etc. have been illustrated in one or more of FIGS. 2A-2D as separate components, devices, systems, modules, etc., it will be appreciated that multiple components, devices, systems, modules, etc. can be implemented as a single component, device, system, module, etc., or a single component, device, system, module, etc. can be implemented as multiple components, devices, systems, modules, etc. Additionally, functions described as being performed by one component, device, system, module, etc. may be performed by multiple components, devices, systems, modules, etc., or functions described as being performed by multiple components, devices, systems, modules, etc. may be performed by a single component, device, system, module, etc.

Figure 3:
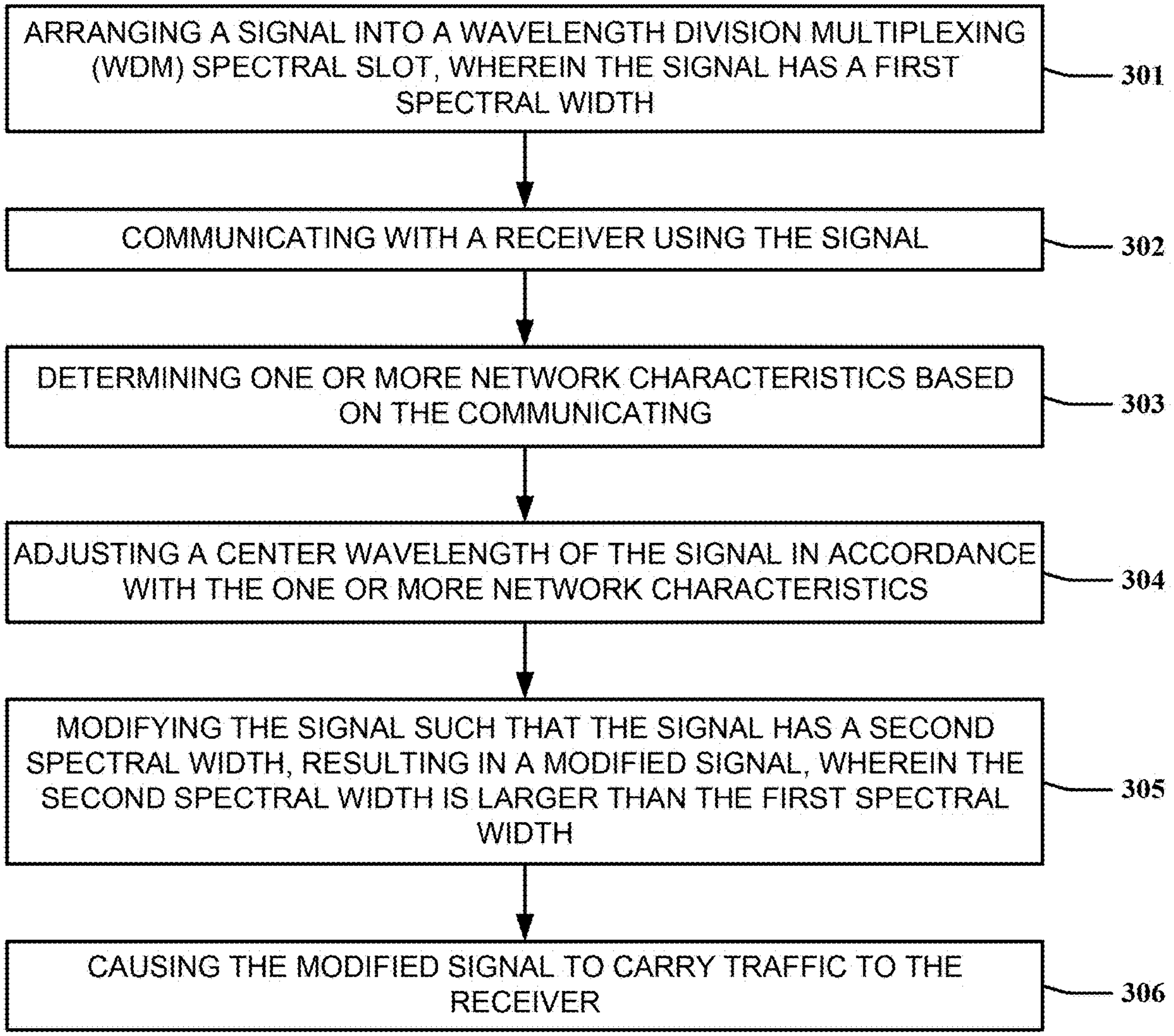
FIG. 3 depicts an illustrative embodiment of a method in accordance with various aspects described herein.

FIG. 3 depicts an illustrative embodiment of a method 300 in accordance with various aspects described herein. For example, the method may be performed by the transmitter 2.

At 301, the method can include arranging a signal into a wavelength division multiplexing (WDM) spectral slot, wherein the signal has a first spectral width. For example, the transmitter 2 may, similar to that described above with respect to FIG. 2D, perform one or more operations that include arranging a signal into a wavelength division multiplexing (WDM) spectral slot, wherein the signal has a first spectral width.

At 302, the method can include communicating with a receiver using the signal. For example, the transmitter 2 may, similar to that described above with respect to FIG. 2D, perform one or more operations that include communicating with a receiver using the signal.

At 303, the method can include determining one or more network characteristics based on the communicating. For example, the transmitter 2 may, similar to that described above with respect to FIG. 2D, perform one or more operations that include determining one or more network characteristics based on the communicating.

At 304, the method can include adjusting a center wavelength of the signal in accordance with the one or more network characteristics. For example, the transmitter 2 may, similar to that described above with respect to FIG. 2D, perform one or more operations that include adjusting a center wavelength of the signal in accordance with the one or more network characteristics.

At 305, the method can include modifying the signal such that the signal has a second spectral width, resulting in a modified signal, wherein the second spectral width is larger than the first spectral width. For example, the transmitter 2 may, similar to that described above with respect to FIG. 2D, perform one or more operations that include modifying the signal such that the signal has a second spectral width, resulting in a modified signal, wherein the second spectral width is larger than the first spectral width.

At 306, the method can include causing the modified signal to carry traffic to the receiver. For example, the transmitter 2 may, similar to that described above with respect to FIG. 2D, perform one or more operations that include causing the modified signal to carry traffic to the receiver.

Whether a network is channel filtered or colorless generally dictates how laser centering control is done. In the case of a colorless network, the WDM spectral slot may be located in between two other WDM spectral slots, and the above-described modifying step may include a spectral width expansion for the signal such that the second spectral width fills a gap between the two other WDM spectral slots. For a network with channel filtering (where each channel is constrained by filter edges), in a case where the WDM spectral slot is constrained by an optical filter, the above-described modifying step may include a spectral width expansion for the signal such that the second spectral width fills a filter passband. Or, in a different case where the WDM spectral slot is constrained by an optical filter on one side of the WDM spectral slot and by a second WDM spectral slot on another side of the WDM spectral slot, the above-described modifying step may include a spectral width expansion for the signal such that the second spectral width fills a gap between a filter edge and the second WDM spectral slot.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include a device, comprising a processing system including a processor, and a memory that stores executable instructions that, when executed by the processing system, facilitate performance of operations. The operations may include arranging a signal into a wavelength division multiplexing (WDM) spectral slot, wherein the signal has a first spectral width, communicating with a receiver using the signal, determining one or more network characteristics based on the communicating, adjusting a center wavelength of the signal in accordance with the one or more network characteristics, modifying the signal such that the signal has a second spectral width, resulting in a modified signal, wherein the second spectral width is larger than the first spectral width, and causing the modified signal to carry traffic to the receiver.

In one or more embodiments, the WDM spectral slot is associated with a WDM network, and the arranging results in the signal being added to the WDM network.

In one or more embodiments, the determining is performed based on information provided by the receiver.

In one or more embodiments, optical spectrum analyzer (OSA) functionality in the receiver or another device performs scanning of a spectrum to identify one or more other WDM spectral slots, and the one or more network characteristics relate to results of the scanning.

In one or more embodiments, the one or more network characteristics relate to laser frequency.

In one or more embodiments, the signal is generated using a laser, and one or more of the arranging, the communicating, the determining, and the adjusting facilitate laser centering control.

In one or more embodiments, the WDM spectral slot is located in between two other WDM spectral slots, and the modifying the signal comprises a spectral width expansion for the signal such that the second spectral width fills a gap between the two other WDM spectral slots.

In one or more embodiments, the device comprises a coherent transmitter modem.

In one or more embodiments, the arranging, the communicating, the determining, and the adjusting are performed during an acquisition stage between the device and the receiver.

In one or more embodiments, the modifying and the causing are performed after an acquisition stage between the device and the receiver.

In one or more embodiments, the modifying is performed by way of ramping up of a spectral width of the signal.

In one or more embodiments, the second spectral width is greater than the first spectral width by at least two times a known maximum signal error.

In one or more embodiments, the first spectral width is equal to a defined minimum spectral width associated with the device.

One or more aspects of the subject disclosure include a non-transitory machine-readable medium, comprising executable instructions that, when executed by a processing system including a processor, facilitate performance of operations. The operations may include arranging a signal into a wavelength division multiplexing (WDM) spectral slot, wherein the signal has a first spectral width, communicating with a receiver using the signal, determining one or more network characteristics based on the communicating, adjusting a center wavelength of the signal in accordance with the one or more network characteristics, and modifying the signal such that the signal has a second spectral width, resulting in a modified signal, wherein the second spectral width is larger than the first spectral width.

In one or more embodiments, the WDM spectral slot is associated with a WDM network, and the arranging results in the signal being added to the WDM network.

In one or more embodiments, the determining is performed based on information provided by the receiver.

In one or more embodiments, optical spectrum analyzer (OSA) functionality in the receiver or another device performs scanning of a spectrum to identify one or more other WDM spectral slots, and the one or more network characteristics relate to results of the scanning.

One or more aspects of the subject disclosure include a method. The method may include arranging, by a processing system including a processor, a signal into a wavelength division multiplexing (WDM) spectral slot, wherein the signal has a first spectral width, communicating, by the processing system, with a receiver using the signal, determining, by the processing system, one or more network characteristics based on the communicating, adjusting, by the processing system, a center wavelength of the signal in accordance with the one or more network characteristics, and modifying, by the processing system, the signal such that the signal has a second spectral width, resulting in a modified signal, wherein the second spectral width is larger than the first spectral width.

In one or more embodiments, the WDM spectral slot is associated with a WDM network, and the arranging results in the signal being added to the WDM network.

In one or more embodiments, the determining is performed based on information provided by the receiver.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms “first,” “second,” “third,” and so forth, as used in the claims, unless otherwise clear by context, is for clarity only and does not otherwise indicate or imply any order in time. For instance, “a first determination,” “a second determination,” and “a third determination,” does not indicate or imply that the first determination is to be made before the second determination, or vice versa, etc.

In the subject specification, terms such as “store,” “storage,” “data store,” data storage,” “database,” and substantially any other information storage component relevant to operation and functionality of a component, refer to “memory components,” or entities embodied in a “memory” or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in some contexts in this application, in some embodiments, the terms “component,” “system” and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. Additionally, functions described as being performed by one component or system may be performed by multiple components or systems, or functions described as being performed by multiple components or systems may be performed by a single component or system, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. An optical modem, comprising:

at least one laser;

a processing system including a processor; and a memory that stores executable instructions that, when executed by the processing system, facilitate performance of operations, the operations comprising arranging a signal, generated using the at least one laser, into a wavelength division multiplexing (WDM) spectral slot, wherein the signal has a first spectral width, communicating with a receiver using the signal, determining one or more network characteristics based on the communicating, adjusting a center wavelength of the signal in accordance with the one or more network characteristics, modifying the signal such that the signal has a second spectral width, resulting in a modified signal, wherein the second spectral width is larger than the first spectral width, and causing the modified signal to carry traffic to the receiver.

2. The optical modem of claim 1, wherein the WDM spectral slot is associated with a WDM network, and wherein the arranging results in the signal being added to the WDM network.

3. The optical modem of claim 1, wherein the arranging involves generating the signal at a determined low baud, disabling or turning off of one or more outer frequency division multiple (FDM) bands, transmitter filtering, or a combination thereof, and wherein the determining is performed based on information provided by the receiver.

4. The optical modem of claim 1, wherein optical spectrum analyzer (OSA) functionality in the receiver or another device performs scanning of a spectrum to identify one or more other WDM spectral slots, and wherein the one or more network characteristics relate to results of the scanning.

5. The optical modem of claim 1, wherein the one or more network characteristics relate to laser frequency.

6. The optical modem of claim 1, wherein the signal is generated using a laser, and wherein one or more of the arranging, the communicating, the determining, and the adjusting facilitate laser centering control.

7. The optical modem of claim 1, wherein the WDM spectral slot is located in between two other WDM spectral slots, and wherein the modifying the signal comprises a spectral width expansion for the signal such that the second spectral width fills a gap between the two other WDM spectral slots.

8. The optical modem of claim 1, wherein the WDM spectral slot is constrained by an optical filter, and wherein the modifying the signal comprises a spectral width expansion for the signal such that the second spectral width fills a filter passband.

9. The optical modem of claim 1, wherein the WDM spectral slot is constrained by an optical filter on one side of the WDM spectral slot and by a second WDM spectral slot on another side of the WDM spectral slot, and wherein the modifying the signal comprises a spectral width expansion for the signal such that the second spectral width fills a gap between a filter edge and the second WDM spectral slot.

10. The optical modem of claim 1, wherein the arranging, the communicating, the determining, and the adjusting are performed during an acquisition stage between the optical modem and the receiver, and wherein the modifying and the causing are performed after the acquisition stage.

11. The optical modem of claim 1, wherein the modifying is performed by way of ramping up of a spectral width of the signal.

12. The optical modem of claim 1, wherein the second spectral width is greater than the first spectral width by at least two times a known maximum signal error.

13. The optical modem of claim 1, wherein the first spectral width is equal to a defined minimum spectral width associated with the optical modem.

14. A non-transitory machine-readable medium, comprising executable instructions that, when executed by a processing system including a processor, facilitate performance of operations, the operations comprising:

arranging a signal into a wavelength division multiplexing (WDM) spectral slot, wherein the signal has a first spectral width;

communicating with a receiver using the signal;

determining one or more network characteristics based on the communicating;

adjusting a center wavelength of the signal in accordance with the one or more network characteristics; and modifying the signal such that the signal has a second spectral width, resulting in a modified signal, wherein the second spectral width is larger than the first spectral width.

15. The non-transitory machine-readable medium of claim 14, wherein the WDM spectral slot is associated with a WDM network, and wherein the arranging results in the signal being added to the WDM network.

16. The non-transitory machine-readable medium of claim 14, wherein the arranging involves generating the signal at a determined low baud, disabling or turning off of one or more outer frequency division multiple (FDM) bands, transmitter filtering, or a combination thereof, and wherein the determining is performed based on information provided by the receiver.

17. The non-transitory machine-readable medium of claim 14, wherein optical spectrum analyzer (OSA) functionality in the receiver or another device performs scanning of a spectrum to identify one or more other WDM spectral slots, and wherein the one or more network characteristics relate to results of the scanning.

18. A method, comprising:

arranging, by a processing system including a processor, a signal into a wavelength division multiplexing (WDM) spectral slot, wherein the signal has a first spectral width;

communicating, by the processing system, with a receiver using the signal;

determining, by the processing system, one or more network characteristics based on the communicating;

adjusting, by the processing system, a center wavelength of the signal in accordance with the one or more network characteristics; and modifying, by the processing system, the signal such that the signal has a second spectral width, resulting in a modified signal, wherein the second spectral width is larger than the first spectral width.

19. The method of claim 18, wherein the WDM spectral slot is associated with a WDM network, and wherein the arranging results in the signal being added to the WDM network.

20. The method of claim 18, wherein the arranging involves generating the signal at a determined low baud, disabling or turning off of one or more outer frequency division multiple (FDM) bands, transmitter filtering, or a combination thereof, and wherein the determining is performed based on information provided by the receiver.

* * * * *